July 21, 1942.    R. E. MOORE ET AL    2,290,347
HEATING SYSTEM
Filed April 23, 1941
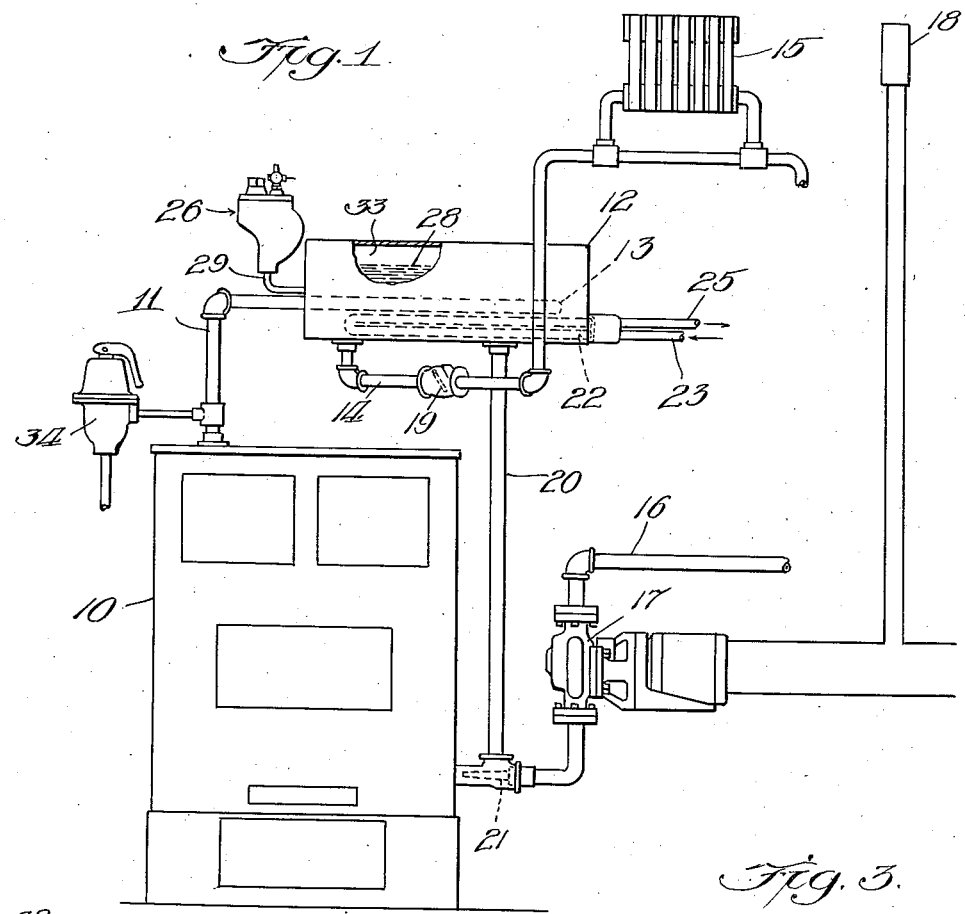
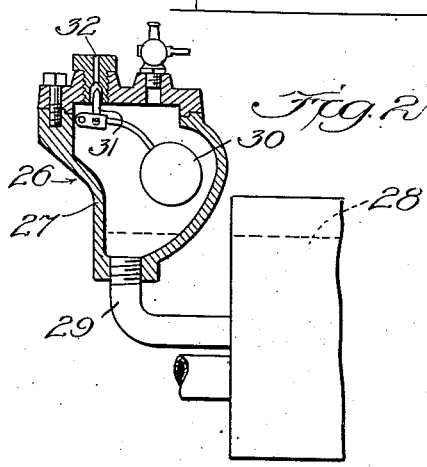
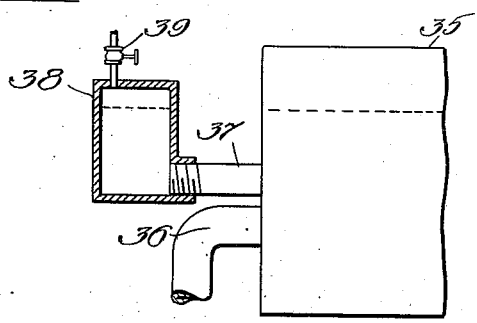
Inventors:
Edwin B. Tidd and
Robert E. Moore
By John W Darley
Atty Patented July 21, 1942

2,290,347

UNITED STATES PATENT OFFICE 2,290,347

HEATING SYSTEM

Robert E. Moore, Park Ridge, and Edwin B. Tidd, Mount Prospect, Ill.

Application April 23, 1941, Serial No. 389,900

8 Claims. (Cl. 237—19)

Our invention relates to hot water heating systems and is concerned more particularly with certain simplifications that reduce the number of parts required, facilitate installation and improve the operating characteristics of the system.

In hot water heating systems of the closed type, it is customary to employ a compression tank which traps the air in the system and provides a cushion of air against sudden pressures and water hammer shocks which might injure the boiler. Hot service water for spigots and other outlets is usually obtained by the so-called indirect method, i. e., a coil is submerged either directly in the boiler water, or in water at some point in the system which is substantially at boiler water temperature. In such an arrangement, however, while the tank and the service water device are connected to the system, they in effect constitute separate units and function independently of each other.

A further objection to the foregoing type of system resides in the tendency for air pockets to form in other parts of the system, such as the upper portions of radiators, flow control valves and other fittings after the system has been placed in operation. Due to the fact that the compression tank is either separately connected to the boiler or is connected to the supply line leading to the radiators, the tank only traps a portion of the air in the system when the latter is first filled, and this condition holds true for air and gases that are liberated from the water when heated. The remaining air initially in the system may be vented from the radiators in the usual manner until the radiators are filled, but that which is liberated accumulates in other portions of the system, as noted above, with a consequent reduction in the heating efficiency of the system. Present methods require the introduction of vents at different parts of the system to rid the system of these air pockets.

It is, therefore, the principal object of our invention to provide a hot water heating system which is characterized by installation and operating advantages relative to a system as outlined above by reason of the fact that the compression and service water heating functions are combined in a single unit, and that provision is made for collecting in the tank substantially all the air in the system, including that which is trapped when the system is initially filled and that liberated when the water is heated.

A further object is to provide a tank unit for a closed system which is constructed and arranged to trap the system air in its upper portion and to heat service water by a cold water coil submerged in water in the lower part thereof which is substantially at boiler water temperature.

A further object is to devise a compression tank of the character indicated which may be somewhat smaller than indicated by present practice because only sufficient air is retained therein to provide an adequate air cushion, the remaining air, trapped and liberated, being vented to the atmosphere.

These and further objects of our invention will be set forth in the following specification, reference being added to the accompanying drawing, and the novel means by which said objects are effectuated will be definitely pointed out in the claims.

In the drawing

Fig. 1 represents an elevation of a hot water heating system arranged in accordance with our invention.

Fig. 2 is a sectional elevation of a typical automatic air vent used with our improved system.

Fig. 3 shows a modified arrangement in which a manually controlled vent is employed.

Referring to the drawing, the numeral 10 designates a hot water boiler of conventional design from the upper part of which extends a riser pipe 11 that terminates within a compression tank 12, preferably located above the boiler. For a purpose hereinafter explained, the outlet end 13 of the pipe 11 is remotely located from the point at which the pipe enters the tank.

A supply pipe 14 is connected to the bottom of the tank 12, preferably adjacent to that wall part of the tank 12 through which the pipe 11 projects. The pipe 14 supplies water to one or more radiators 15 and the water is thereafter conveyed to the boiler by means of a return pipe 16 which may include a circulating pump 17 that is responsive to the heat demands of a room thermostat 18 which is functionally located with respect to the radiator 15. It will be understood, however, that the pump 17 may be located at any convenient part of the system without departing from the concept involved.

A flow control valve 19 of the usual swing check type is interposed in the supply pipe 14, the arrangement being such that when the pump 17 is operating the valve 19 will lift to permit the flow of water to the radiators and when the pump 17 ceases operation, the valve will drop by gravity to a closed position.

In order to provide for a local and thermogravitational circulation of water between the boiler and tank when the pump 17 is not operating, a pipe 20 connects the lower part of the tank with the return pipe 16. Adjacent the junction of the pipes 16 and 20, it is preferred that a jet or nozzle 21 be mounted within the pipe 16 so that when the pump 17 is operating the discharge of water through the nozzle 21, will induce a flow of water through the pipe 20 and thus prevent, as might otherwise happen in the absence of the nozzle, a counterflow of water upward through the pipe 20 under the pressure of the pump.

Hot water for spigots and the usual service outlets is furnished by means of an indirect heater in the form of a coil 22 which is disposed in the lower portion of the tank 12 and extends for a substantial length thereof between the pipe 11 and the outlet to the supply pipe 14. Cold water may be supplied to this coil through a pipe 23 and hot water to the outlets is delivered through a pipe 25.

An automatic air vent 26 is employed to vent from the system a considerable portion of the initially trapped air and air liberated during heating, leaving only a sufficient volume in the tank to provide the required cushion. The vent comprises a housing 27 which is connected to the water space 28 in the tank by an elbow 29 that is preferably mounted in the end of the tank at some point along the horizontal center line thereof. Within the housing is pivoted a float ball 30 that actuates a valve 31 to close a discharge port 32 communicating with the atmosphere. When the system is initially filled, a mass of air 33 is trapped in the tank and the closing of the port 32 in the ball 30 prevents loss of water through the port. The usual pressure relief valve 34 may be connected to the supply pipe 11, for the purpose of relieving water to a drain when the pressure in the system reaches or exceeds a predetermined amount, a characteristic figure being of the order of thirty pounds per square inch.

In describing the operation of the foregoing arrangement, it will be assumed that the system has been completely filled with water so that the cushion of air 33 has been trapped in the tank between the surface of the water 28 and the top side of the tank. It will also be understood that under all conditions of operation, the portion of the pipe 11 that extends within the tank 12 is always submerged within the water in the tank as is also the heating coil 22, and that the relation of the vent 26 to the tank is such that no water can escape through the port 32.

When the pump 17 is not operating, heating of the water in the boiler merely establishes a local circulation from the boiler and then successively through the pipe 11, tank 12, and pipes 20 and 16, for return to the boiler. However, when the room thermostat 18 calls for heat, the pump 17 circulates the water rapidly through the system, including the radiator 15 and the return pipe 16, and the pressure created by the pump opens the valve 19 to permit this flow.

Regardless, however, of whether the pump is operating or not an ample quantity of service water is always available through the medium of the coil 22 which is always submerged in water substantially at boiler temperature. The rate of heat exchange between the water in the tank and the water in the coil 22 is materially increased by reason of the fact that the water in passing from the end 13 of the pipe 11 to the supply pipe 14 is required to traverse substantially the whole length of the heating coil 22. This reversal of flow in the tank also sets up a condition of turbulence that varies with the speed of flow of the water which facilitates the separation of air and gas from the heated water.

This liberated air and gas is also collected over the surface of the water in the tank and when the pressure in the system rises sufficiently, the water in the tank is forced downwardly until a portion of the accumulated air is relieved into the automatic vent and thence to the atmosphere. Eventually, the water in the system is completely freed of liberated air and gas and becomes relatively "dead." In this condition, we have ascertained that the expansion of the water is relatively small, so that it is possible to use a smaller compression tank than that heretofore employed in hot water heating systems, i. e., a tank only large enough to handle the water expansion and provide a sufficient air cushion. Tank sizes will vary with the size of the associated system.

Our improved tank unit is particularly useful in systems which include the convection type of radiator wherein the water flows through pipes having laterally extending, thin, radiating fins. Such radiators are designed to contain a materially smaller amount of water than the standard type of radiator, and it has been determined that a pocket of air in one of the pipes as small as one cubic inch will completely stop circulation.

In Fig. 3 is illustrated a modified arrangement which incorporates a manually controlled vent. The numeral 35 designates a compression tank similar to the tank 12 and which is supplied with hot water by means of a pipe 36 similar to the pipe 11. A pipe 37 is mounted in the end of the tank 35 in the same manner as the elbow 29 and connects the tank with an auxiliary vent chamber 38 provided with a hand vent 39. Air and gases which accumulate in the chamber 38 as described above for the automatic vent may be manually relieved from time to time to the atmosphere.

According to our invention, therefore, it is possible to not only utilize the tank 12 as a compression tank for the usual purpose of providing an air cushion, but also as a means of storing hot water that is indirectly used to heat the service water. This arrangement eliminates the necessity of providing one tank for compression purposes and a separate tank or chamber which is only used for heating service water. The tank and heater are readily combined in a single unit that offers many installation advantages.

Moreover, the association of our tank unit with a vent, automatic or manual, insures that the remainder of the system will be substantially free from pockets of air, since this air will separate from the water while passing through the tank and will be evacuated to the atmosphere. The tank may be employed in any type of hot water heating system, whether of the gravity or forced circulation type, and regardless of whether the radiators are disposed above or below the boiler, or both. Moreover, as far as the venting aspect of our invention is concerned, it is immaterial whether the indirect heater 22 is submerged in the tank or in some other portion of the system.

We claim:

1. In a closed hot water heating system having a boiler and supply and return pipes for connecting the boiler to radiating devices, a compression tank above the boiler having communicating air and water spaces interposed in and constituting a part of the supply pipe, the tank discharge and inlet ends of the supply pipe being submerged within the water space of the tank, a pump for circulating water through the system in response to heating demands of the devices, a flow control valve in that part of the supply pipe leading from the tank to the devices, the valve being arranged to normally resist movement of water through the supply pipe and opened by pump pressure, and a pipe connecting the water space in the tank with the return pipe to provide local circulation through the boiler when the pump is not operating.

2. In a closed hot water heating system having a boiler and supply and return pipes for connecting the boiler to radiating devices, a compression tank having communicating air and water spaces interposed in and constituting a part of the supply pipe, the ends of the supply pipe which are connected to the tank being submerged within the water space of the tank, a pump for circulating water through the system in response to heating demands of the devices, a flow control valve in that part of the supply pipe leading from the tank arranged to normally resist movement of water through the pipe and opened by pump pressure, a pipe connecting the water space with the return pipe to provide local circulation through the boiler when the pump is not operating, and nozzle means in the return pipe adjacent the junction of the last named pipe therewith and through which all water passing through the return pipe is pumped to thereby induce a flow of water through the last named pipe when the pump is operating.

3. In a closed hot water heating system having a boiler, a tank having its upper portion sealed to provide an air trap, inlet and outlet pipes connecting the tank to the boiler, a third pipe connecting the tank to the atmosphere, all of the pipes being connected to the tank below the operating level of the water therein, and means in the third pipe operable by the rise of water therein for preventing flow of water therethrough but permitting escape of air thereinto from the tank when the water level in the tank drops to expose the third pipe connection.

4. In a closed hot water heating system having a boiler, a tank having its upper portion sealed to provide an air trap, inlet and outlet pipes connecting the tank to the boiler, a third pipe connecting the tank to the atmosphere, all of the pipes being connected to the tank below the operating level of the water therein, and a float operated valve in the third pipe operable by the rise of water therein for preventing flow of water therethrough but permitting escape of air thereinto from the tank when the water level in the tank drops to expose the third pipe connection.

5. In a closed hot water heating system having a boiler and a supply pipe for connecting the boiler to radiating devices, a tank constituting a part of the supply pipe and having its upper portion sealed to provide an air trap, a vent pipe connecting the tank to the atmosphere, the vent pipe and the inlet and outlet ends of the supply pipe relative to the tank being connected to the tank below the operating level of the water therein, and means in the vent pipe operable by the rise of water therein for preventing flow of water through the vent pipe but permitting escape of air thereinto from the tank when the water level of the tank drops to expose the vent pipe connection thereto.

6. A unit for interposing between the boiler and radiator devices of a closed hot water heating system comprising a tank having its upper portion sealed to provide an air trap, inlet and outlet pipes for providing a circulating connection between the tank and boiler, a third pipe connecting the tank to the atmosphere, all of the pipes being connected to the tank below the operating level of the water therein, and means in the third pipe operable by the rise of water therein for preventing flow of water through the third pipe but permitting the escape of air thereinto from the tank when the water level in the tank drops to expose the third pipe connection thereto.

7. A unit for interposing between the boiler and radiator devices of a closed hot water heating system, comprising a tank having its upper portion sealed to provide an air trap, inlet and outlet pipes for providing a circulating connection between the tank and boiler, a third pipe connecting the tank to the atmosphere, all of the pipes being connected to the tank below the operating level of the water therein, and a float operated valve in the third pipe operable by the rise of water therein for preventing flow of water through the third pipe but permitting the escape of air thereinto from the tank when the water level in the tank drops to expose the third pipe connection thereto.

8. In a closed hot water heating system having a boiler and a pipe providing a means of circulation between the boiler and radiating devices, a compression tank having communicating air and water spaces interposed in and constituting a part of the pipe, the ends of the pipe which are connected to the tank being submerged within the water space of the tank, a pump for circulating water through the system in response to heat demands of the devices, a by-pass connecting the water space in the tank with the portion of the pipe constituting a return from the devices to the boiler to provide local circulation through the boiler when the pump is not operating, and a flow control valve in that part of the pipe between the tank and the connection to the by-pass and arranged to normally resist movement of water through said part and opened by pump pressure.

ROBERT E. MOORE.
EDWIN B. TIDD.